US006955045B2

(12) United States Patent
Evans

(10) Patent No.: US 6,955,045 B2
(45) Date of Patent: Oct. 18, 2005

(54) OIL PUMP SYSTEM

(75) Inventor: Arthur Leon Evans, Putnam County, IN (US)

(73) Assignee: Magic Circle Corporation, Coatesville, IN (US)

( * ) Notice: Subject to any disclaimer, the term of this patent is extended or adjusted under 35 U.S.C. 154(b) by 275 days.

(21) Appl. No.: 10/367,540

(22) Filed: Feb. 19, 2003

(65) Prior Publication Data

US 2004/0161344 A1 Aug. 19, 2004

(51) Int. Cl.[7] ............................................ F16D 31/02
(52) U.S. Cl. ........................ 60/464; 417/270; 417/308
(58) Field of Search ......................... 417/222.1, 222.2, 417/218, 274, 279, 308, 270; 60/327, 420, 445, 464

(56) References Cited

U.S. PATENT DOCUMENTS 3,359,727 A * 12/1967 Hann et al. .................. 60/389
3,605,583 A * 9/1971 Keppler ..................... 404/117
3,785,157 A * 1/1974 Kittle et al. ................. 60/493
3,863,449 A * 2/1975 White, Jr. .................... 60/464
3,874,523 A * 4/1975 Brock et al. ............... 414/267
3,890,783 A * 6/1975 Allen et al. ................... 60/420
4,367,699 A * 1/1983 Evans ..................... 123/41.23
4,694,648 A * 9/1987 Beck, Jr. ..................... 60/452
4,936,095 A * 6/1990 Ross et al. .................... 60/464
5,901,536 A * 5/1999 Kallevig ..................... 56/10.9
6,145,312 A * 11/2000 Hauser et al. ................ 60/464
6,837,047 B2 * 1/2005 Dong et al. ................... 60/464

* cited by examiner

*Primary Examiner*—Michael Koczo
(74) *Attorney, Agent, or Firm*—Jack Schuman

(57) ABSTRACT

Variable displacement pump pumps oil to one or the other ports of an oil operated vehicle wheel motor to drive a lawn mower.

2 Claims, 2 Drawing Sheets

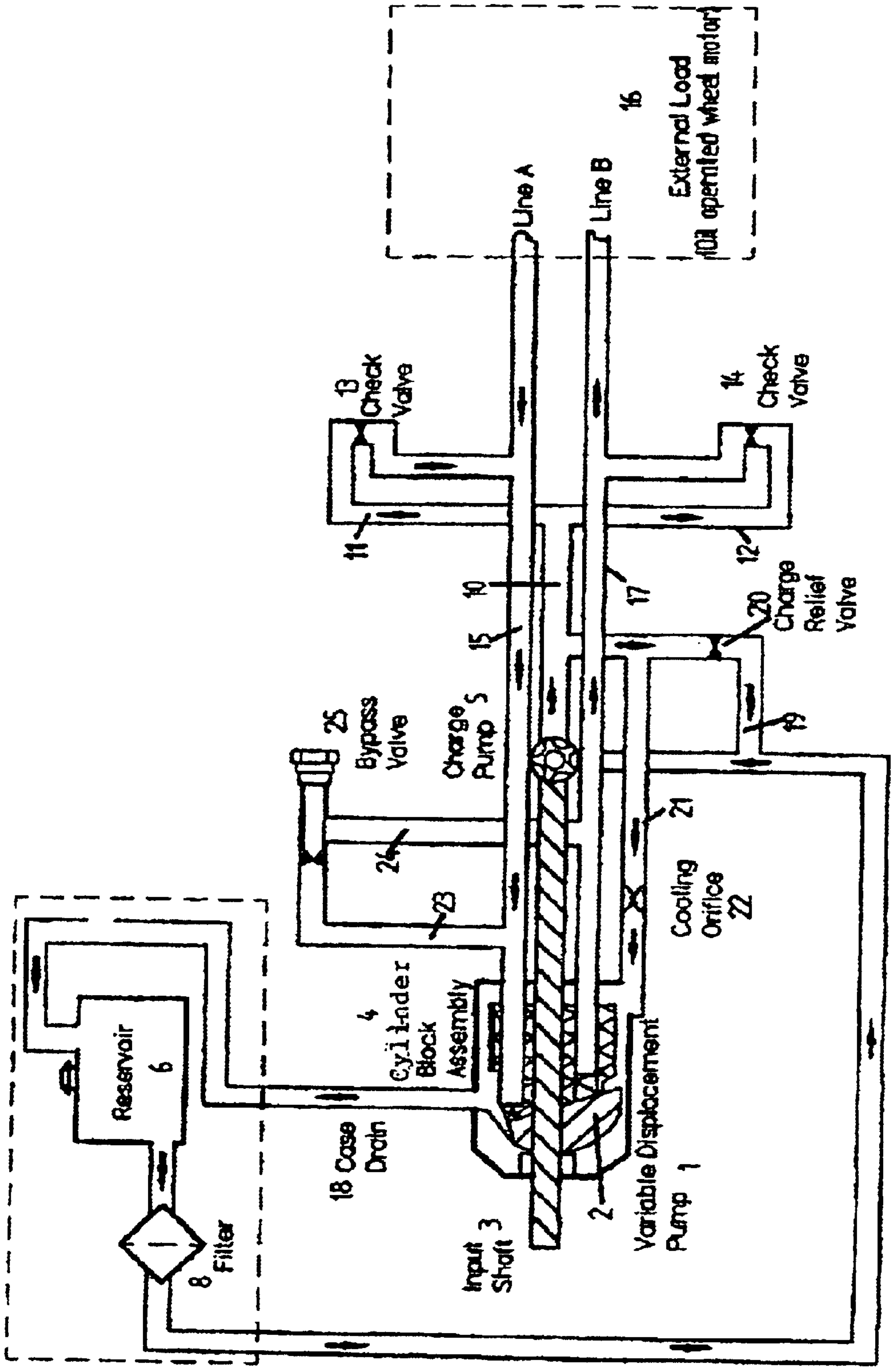
Figure 1 - Prior Art

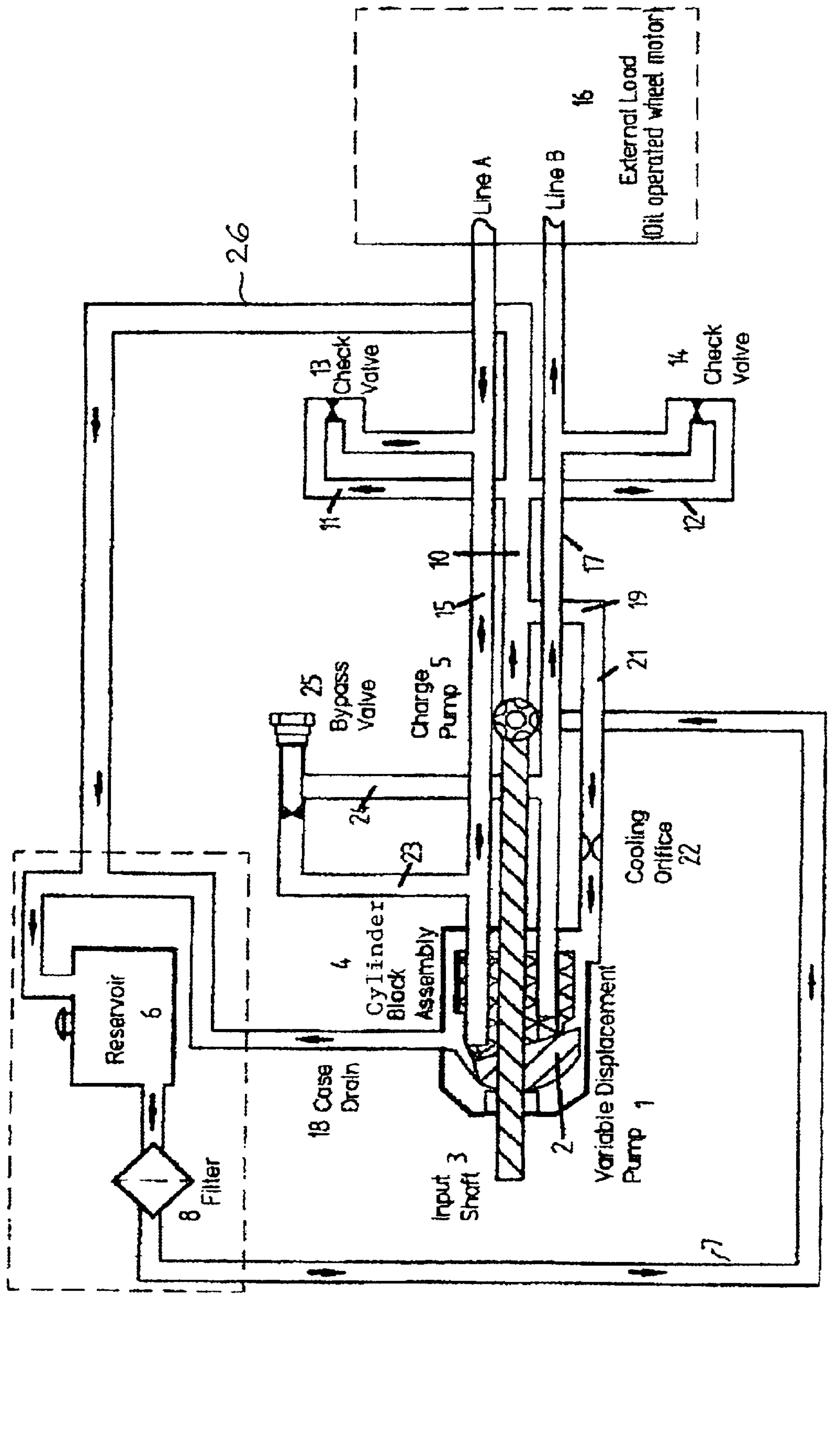
Figure 2 - Present Invention

OIL PUMP SYSTEM

BACKGROUND OF THE INVENTION

1. Field of the Invention

This invention relates, broadly speaking, to a novel oil pumping system.

More particularly, this invention relates to a novel oil pumping system operating an oil-driven motor.

2. Description of the Prior Art

The prior art, as shown herein, discloses an oil pumping system operating an oil-driven motor, which at times develops a high operating temperature adversely affecting the pump operation.

SUMMARY OF THE PRESENT INVENTION

One of the objects of the present invention is to provide pump circuitry improved over the prior art whereby to avoid the development of high operating temperatures in the system.

Other and further objects of the present invention will become apparent by reference to the accompanying specification and drawings, and to the appended claims.

Briefly, the foregoing objects are attained by eliminating that portion of the prior art pump circuitry which comprises the charge relief valve and the oil line running from the charge relief valve to the inlet line and, instead, extending an oil line from the exit of the charge pump to the oil reservoir. This change in pump circuitry eliminates the disadvantage of the prior art and permits a relatively cool operation of the pump circuitry.

DESCRIPTION OF THE DRAWINGS

Referring now to the drawings in which like numerals represent like parts in the several views:

FIG. 1 represents, diagrammatically, the prior art pump circuitry.

FIG. 2 represents, diagrammatically, the novel and improved pump circuitry of the present invention.

DESCRIPTION OF THE PRIOR ART AND OF THE PREFERRED EMBODIMENT OF THE PRESENT INVENTION

In FIGS. 1 and 2, blocks indicated by dashed lines are not part of the pump circuitry.

With reference to the prior art pump circuitry as shown in FIG. 1, pump 1 comprises a variable displacement swash plate 2, input shaft 3, cylinder block assembly 4 and charge pump 5.

Oil reservoir 6 is provided, external to pump 1, and oil line 7 runs from oil reservoir 6 through filter 8 to the inlet of charge pump 5.

Input shaft 3 is rotated in one direction only by an engine/drive belt/pulley combination (not shown) or by a direct drive gear box (not shown). Variable displacement swash plate 2 and charge plate 5 are mounted to and rotatably driven by said input shaft 3. Output of the system oil flow is controlled by the direction and amount that variable displacement swash plate 2 is angled on input shaft 3.

Charge pump 5 pumps oil through oil line 10 to oil lines 11 and 12. Chck valves 13 and 14 are provided in lines 11 and 12, respectively.

Oil line 15 runs between one port of an oil-operated vehicle wheel motor as on a riding lawn mower and constituting the external load 16 and the cylinder block assembly 4.

Oil line 11, upstream of check valve 13, communicates with oil line 15.

Oil line 17 runs between the other port of the oil operated vehicle wheel motor constituting the external load 16 and the cylinder block assembly 4.

Oil line 12, upstream of check valve 14, communicates with oil line 17.

Variable displacement swash plate 2, rotated by input shaft 3, forces oil alternately into one or the other oil lines 15 and 17, and thus oil is supplied under pressure to one or the other ports of the oil operated vehicle wheel wheel motor constituting the external load 16.

As the angle of the variable displacement swash plate 2 is increased, the amount of oil being pumped will increase, thereby increasing the spin of the oil operated vehicle wheel motor (the external load 16).

Reversing the angle of the variable displacement swash plate 2 will reverse the direction of oil flow.

During the operation of pump 1, oil is “lost” from the oil loop through various leak paths designed in the apparatus for lubrication purposes. This “lost” oil returns to reservoir 6 from the cylinder block assembly 4 through case drain 18, and must be made up in the oil loop. This is done by the charge pump 5 operated by input shaft 3. Charge pump 5 supplies oil under pressure to keep the closed oil loop pressurized, preventing cavitation and providing a cooling oil flow for the system.

The makeup oil flow is controlled or directed by check valves 13 and 14, alternately, which are used to direct makeup oil (to replace the “lost” oil) into the low pressure oil line (alternately oil lines 15 and 17) of the closed oil loop. Each check valve 13 or 14 either will be held open or closed depending upon the direction in which the vehicle is propelled by the oil operated vehicle wheel motor (one example of a preferred use of the present invention).

Thus, if oil line 17 is the high pressure oil line at one point in the cycle of operation of variable displacement pump 1, as shown in FIG. 1, check valve 14 is open, and oil from oil line 12 will flow past check valve 14 and into oil line 17. At the same time, at the same point in the cycle of operation of variable displacement pump 1, oil line 15 will be the low pressure oil line, again as shown in FIG. 1, and check valve 13 will close and block the flow of oil from oil line 11 into oil line 15. The direction of rotation of the oil operated vehicle wheel motor will depend upon which of oil lines 15 and 17 is the high pressure line.

Oil line 19 communicates through charge relief valve 20 with oil line 7, and also communicates through oil line 21 and cooling orifice 22 with variable displacement pump 1.

Charge relief valve 20 functions to maintain the charge of oil in the system at a predetermined pressure. If the predetermined pressure is exceeded, excess oil passes into oil line 7 and thence to the inlet of charge pump 5.

When oil is blocked by charge relief valve 20, the said oil passes through oil line 21 and cooling orifice 22 into the cylinder block assembly and thence through case drain 18 into reservoir 6.

Oil lines 23 and 24 communicate through bypass valve 25, when operation thereof becomes necessary because of excessively high pressure differences between oil lines 15 and 17. Opening bypass valve 25 permits the passage of oil between oil lines 15 and 17 to reduce the said pressure differences.

Full operating details of the prior art device may be obtained from the manufacturer thereof, Sundstrand Corp.

The preferred embodiment of the present invention will now be described.

I have discovered that the cause of excessively high operating temperatures in the prior art system is the presence of the charge relief valve 20.

FIG. 2 shows the novel and improved pump circuitry forming the present invention.

Charge relief valve 20 of the prior art device has been eliminated. Oil line 26 has been added, communicating with oil line 10 preferably past the intersection of oil line 10 with oil lines 11 and 12, and running to reservoir 6

Otherwise, the elements of the pump circuitry shown in FIG. 2 are the same as shown in FIG. 1.

Pump circuitry constructed and operated according to FIG. 2 will not exhibit high operating temperatures and constitute a vast improvement over the prior art.

Since modifications and changes which do not depart from the spirit of this invention as disclosed herein may readily occur to those skilled in the art to which this invention pertains, the appended claims should be construed as covering all suitable modifications and equivalents.

I claim:

1. In an oil pumping system (1) for a riding lawn mower, receiving oil from an oil reservoir (6) and pumping oil under pressure to an external load (16), having an input shaft (3) rotated by an external source of power, a cylinder block assembly (4), a variable displacement swash plate (2) inside said cylinder block assembly (4) secured to and rotated by said input shaft (3), a charge pump (5) secured to and operated by said input shaft (3), a first oil line (15) communicating between said variable displacement swash plate 2 and said external load (16), a second oil line (17) communicating between said variable displacement swash plate (2) and said external load (16), said first oil line (15) carrying oil under high pressure at a first point in the cycle of operation of the system from said cylinder block assembly (4) to said external load (16) or alternately carrying oil under low pressure at a second point in the cycle of operation of the system from said external load (16) to said cylinder block assembly (4), said second oil line (17) carrying oil under low pressure at said first point in the cycle of operation of the system from said external load (16) to said cylinder block assembly (4) or alternately carrying oil under high pressure at said second point in the cycle of operation of the system from said cylinder block assembly (4) to said external load (16), a third oil line (10) carrying oil from said charge pump (5) through an oil line (11) and a check valve (13) to said first oil line (15) and through an oil line (12) through a check valve (14) to said second oil line 17, the combination comprising:

(a) a fourth oil line (26) communicating between said said third oil line (10) and said reservoir (6) and carrying oil from said third oil line (10) to said reservoir (6), (b) a fifth oil line (19,21) communicating directly between said third oil line (10) and said cylinder block assembly (4) without the interposition of a check valve therein.

2. Oil pumping system for a riding lawn mower as in claim 1, wherein:

(c) said external load (16) is an oil operated vehicle wheel motor having two ports, (d) said first oil line (15) communicates with one of said ports, (e) said second oil line (17) communicates with the other of said ports.

* * * * *